(12) United States Patent
Abrach et al.

(10) Patent No.: US 11,226,733 B2
(45) Date of Patent: *Jan. 18, 2022

(54) SYSTEMS AND METHODS OF MULTI-TOUCH CONCURRENT DISPENSING

(71) Applicant: Marmon Foodservice Technologies, Inc., Osseo, MN (US)

(72) Inventors: Hector Abrach, Atlanta, GA (US); Jeffrey Joray, Lake Villa, IL (US); Vincenzo DiFatta, Wood Dale, IL (US); Fernando Sanchez, Chicago, IL (US); E. Scott Sevcik, Crystal Lake, IL (US)

(73) Assignee: Marmon Foodservice Technologies, Inc., Osseo, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/860,609

(22) Filed: Apr. 28, 2020

(65) Prior Publication Data

US 2020/0257426 A1 Aug. 13, 2020

Related U.S. Application Data

(63) Continuation of application No. 15/863,066, filed on Jan. 5, 2018, now Pat. No. 10,671,270, which is a
(Continued)

(51) Int. Cl.
*G06F 3/0488* (2013.01)
*G06F 3/0486* (2013.01)
(Continued)

(52) U.S. Cl.
CPC ........ *G06F 3/0488* (2013.01); *A47J 31/4403* (2013.01); *G06F 3/0482* (2013.01);
(Continued)

(58) Field of Classification Search
CPC ............ G06F 16/9035; G06F 16/9535; G06F 16/9566; G06F 16/9538; G06F 16/957
See application file for complete search history.

(56) References Cited

U.S. PATENT DOCUMENTS 5,831,862 A 11/1998 Hetrick et al.
6,751,525 B1 6/2004 Crisp, III
(Continued)

FOREIGN PATENT DOCUMENTS

CN 101073468 A 11/2007
CN 101262802 A 9/2008
(Continued)

OTHER PUBLICATIONS

International Search Report and Written Opinion, PCT/US2015/032436, dated Aug. 21, 2015.
(Continued)

*Primary Examiner* — Pei Yong Weng
(74) *Attorney, Agent, or Firm* — Andrus Intellectual Property Law, LLP

(57) ABSTRACT

Systems and method for beverage dispense from a plurality of users include a beverage dispenser with a touch-sensitive graphical display. A computer of the beverage dispenser receives touch event data points and identifies one or more GUI sections of a plurality of GUI sections associated with the received touch event data points. The computer further operates to interpret a touch event input and provide a command responsive to the input to an associated dispensing unit.

20 Claims, 8 Drawing Sheets

Related U.S. Application Data continuation of application No. 14/696,592, filed on Apr. 27, 2015, now Pat. No. 9,886,185.

(60) Provisional application No. 62/009,390, filed on Jun. 9, 2014.

(51) Int. Cl.
| | | |
|---|---|---|
| *G07F 13/06* | (2006.01) | |
| *A47J 31/44* | (2006.01) | |
| *G06F 3/0481* | (2013.01) | |
| *G06F 3/0482* | (2013.01) | |
| *G06F 3/0484* | (2013.01) | |
| *B67D 1/00* | (2006.01) | |

(52) U.S. Cl.
CPC ........ *G06F 3/0486* (2013.01); *G06F 3/04817* (2013.01); *G06F 3/04842* (2013.01); *G07F 13/065* (2013.01); *B67D 1/0036* (2013.01)

(56) References Cited

U.S. PATENT DOCUMENTS

| | | | |
|---|---|---|---|
| 6,798,997 | B1 | 9/2004 | Hayward et al. |
| 6,799,085 | B1 | 9/2004 | Crisp, III |
| 6,857,439 | B1 | 2/2005 | Perruca et al. |
| 6,994,231 | B2 | 2/2006 | Jones |
| 7,004,355 | B1 | 2/2006 | Crisp, III |
| 7,083,071 | B1 | 8/2006 | Crisp, III |
| 7,663,607 | B2 | 2/2010 | Hotelling et al. |
| 7,754,025 | B1 | 7/2010 | Crisp, III |
| 7,757,896 | B2 | 7/2010 | Carpenter et al. |
| 7,806,294 | B2 | 10/2010 | Gatipon et al. |
| 7,997,448 | B1 | 8/2011 | Leyba |
| 80,022,941 | | 9/2011 | Smoot |
| 8,032,251 | B2 | 10/2011 | Monn |
| 8,103,378 | B2 | 1/2012 | Crisp, III |
| 8,181,824 | B2 | 5/2012 | Ziesel et al. |
| 8,201,736 | B2 | 6/2012 | Doglioni Majer |
| 8,364,321 | B2 | 1/2013 | Kollep |
| 8,405,616 | B2 | 3/2013 | Jung et al. |
| 8,565,917 | B2 | 10/2013 | Crisp, III |
| 8,567,642 | B2 | 10/2013 | Hoover |
| 8,739,840 | B2 | 6/2014 | Mattos, Jr. et al. |
| 8,777,103 | B2 | 7/2014 | Doglioni Majer |
| 8,833,405 | B2 | 9/2014 | Phallen et al. |
| 8,881,948 | B1 | 11/2014 | Lassota |
| 2003/0201984 | A1* | 10/2003 | Falvo .................. G06F 3/04886 345/173 |
| 2006/0115570 | A1 | 6/2006 | Guerrero et al. |
| 2006/0188620 | A1 | 8/2006 | Gutwein et al. |
| 2009/0095771 | A1 | 4/2009 | Hoover |
| 2009/0136632 | A1* | 5/2009 | Gutwein .................. A23F 5/243 426/231 |
| 2010/0084426 | A1 | 4/2010 | Devers et al. |
| 2010/0125362 | A1 | 5/2010 | Canora et al. |
| 2011/0192495 | A1 | 8/2011 | Deo et al. |
| 2011/0241230 | A1 | 10/2011 | Kerfoot |
| 2011/0315711 | A1 | 12/2011 | Hecht et al. |
| 2012/0156344 | A1 | 6/2012 | Studor et al. |
| 2012/0158173 | A1 | 6/2012 | Metropulos |
| 2012/0253993 | A1 | 10/2012 | Yoadkim et al. |
| 2012/0258216 | A1 | 10/2012 | Wessels |
| 2013/0024465 | A1* | 1/2013 | Schiff .................. G06F 16/9535 707/749 |
| 2013/0106690 | A1* | 5/2013 | Lim ...................... G06F 3/0482 345/156 |
| 2013/0201132 | A1 | 8/2013 | Kunioka et al. |
| 2013/0304265 | A1 | 11/2013 | Deo et al. |
| 2014/0025513 | A1 | 1/2014 | Cooke et al. |
| 2014/0157128 | A1* | 6/2014 | Hussain .............. G06F 3/04883 715/727 |
| 2014/0188271 | A1 | 7/2014 | Hernandez et al. |
| 2014/0229978 | A1 | 8/2014 | Rudman et al. |
| 2014/0299630 | A1* | 10/2014 | Brown .................. B67D 3/0054 222/129.1 |
| 2015/0170533 | A1 | 6/2015 | Hayashi et al. |
| 2017/0055552 | A1 | 3/2017 | Giardino et al. |
| 2018/0213824 | A1 | 8/2018 | Schacht et al. |
| 2018/0236417 | A1 | 8/2018 | Wilburn Borders |
| 2019/0364932 | A1 | 12/2019 | Lisiecki |

FOREIGN PATENT DOCUMENTS

| | | |
|---|---|---|
| CN | 201219827 Y | 4/2009 |
| CN | 201782606 U | 4/2011 |
| CN | 201855132 U | 6/2011 |
| CN | 202154538 U | 3/2012 |
| CN | 102666364 A | 9/2012 |
| JP | 2012174112 | 9/2012 |
| WO | 2014034826 | 3/2014 |

OTHER PUBLICATIONS

International Preliminary Report on Patentabiity, PCT/US2015/032436, dated Dec. 15, 2016.
Extended European Search Report, EP Patent Application No. 15806975.7, dated Feb. 9, 2018.
International Search Report and Written Opinion for PCT/US2019/067931, dated Mar. 18, 2020.
Office Action for Chinese Patent Application No. 201910527864.1, dated Dec. 31, 2020.
Notice of Reasons for Refusal for Japanese Patent Application No. 2020-078171, dated Mar. 25, 2021.

* cited by examiner

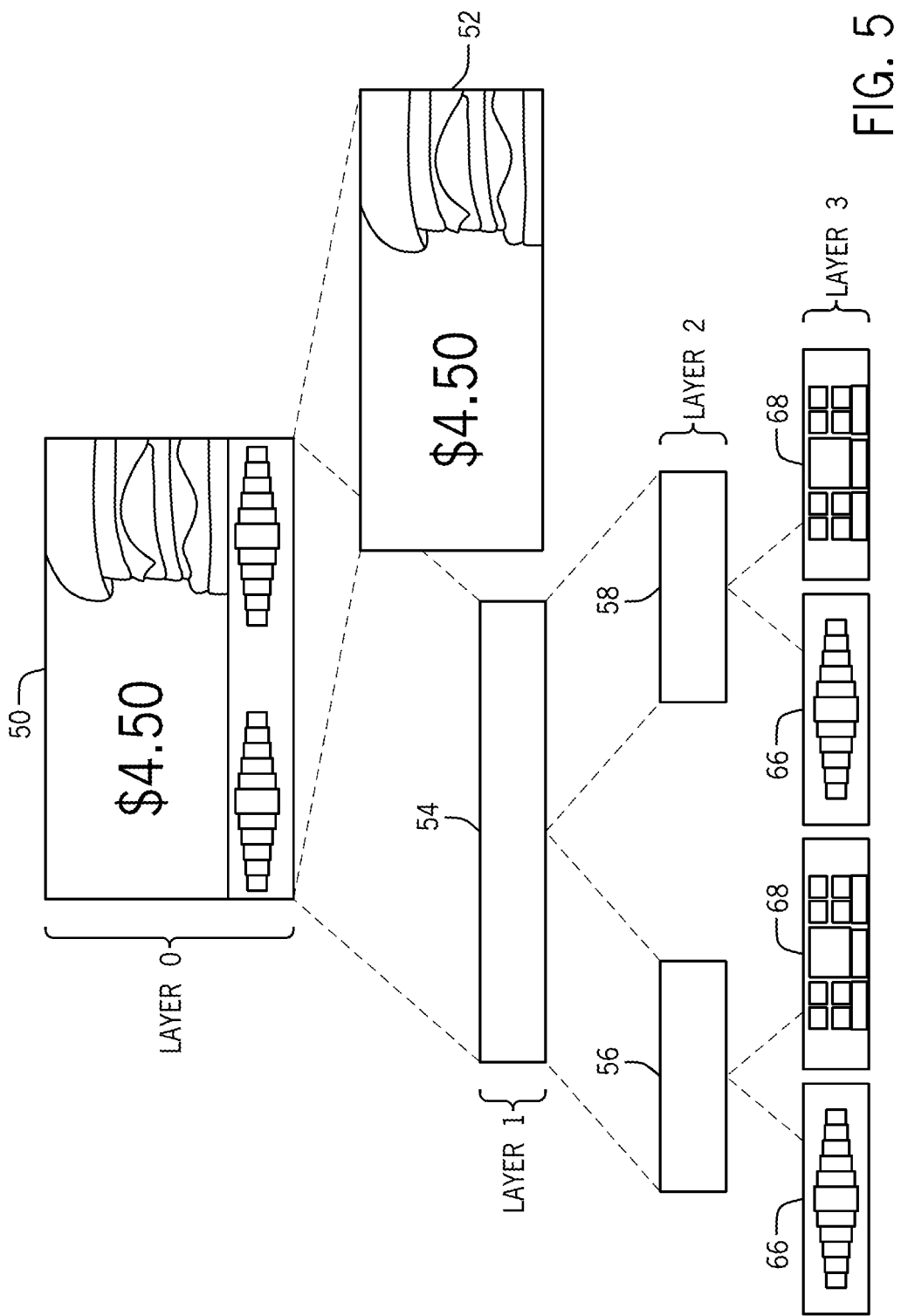

SYSTEMS AND METHODS OF MULTI-TOUCH CONCURRENT DISPENSING

CROSS-REFERENCE TO RELATED APPLICATION

The present application is a continuation of U.S. patent application Ser. No. 15/863,066, filed Jan. 5, 2018, which is a continuation of U.S. patent application Ser. No. 14/696,592, filed Apr. 27, 2015, which '592 application claims priority of U.S. Provisional Patent Application No. 62/009,390, filed on Jun. 9, 2014, the contents of which are hereby incorporated herein by reference in its entirety.

FIELD

The present disclosure relates to the field of beverage dispensing. More particularly, the present disclosure relates to a beverage dispenser supporting concurrent dispensing with a multi-touch input device.

BACKGROUND

Beverage dispensing machines are used in a wide variety of settings, including restaurants, convenience stores, and concession stands. Beverage dispensers can be configured to dispense branded drinks including carbonated soft drinks, non-carbonated drinks, or teas. Beverage dispensers may also be used to dispense beverages that are custom or proprietary to a particular location or venue. Beverage dispensers are also used in diverse operational settings, either operated by a food service worker such as in a restaurant setting or by a customer themselves, for example in a convenience store setting.

While touch screen user interfaces provide convenience and flexibility to adapt a beverage dispenser to a manner or a setting in which it will be used, touch-sensitive displays are typically used by a single operator at one time. Therefore, a beverage dispenser configured to be used by multiple users at the same time must resort to multiple independent user interfaces for each dispensing arrangement.

Furthermore, the arrangement of multi-touch displays and the manner in which multi-touch displays are configured to output detected touch events presents challenges when multiple touch inputs are to be interpreted as independent inputs rather than as components of a multi input gesture. Still further touch-sensitive displays have difficultly in detecting and interpreting "touch and hold" inputs, particularly when other multi-touch inputs are concurrently or simultaneously received.

Therefore, the systems and methods for dispensing with multi-touch input for multiple concurrent dispensing as disclosed herein represent improvements over the prior art.

BRIEF DISCLOSURE

This disclosure is provided to introduce a selection of concepts that are further described herein below in the Detailed Description. This disclosure is not intended to identify key or essential features of the claimed subject matter, nor is it intended to be used as an aid in limiting the scope of the claimed subject matter.

An exemplary embodiment of a beverage dispenser includes a touch-sensitive graphical display. The touch-sensitive graphical display is operable to simultaneously receive a plurality of touch inputs and produce a list of touch event data points representing received touch inputs. The touch-sensitive graphical display is operable to present a graphical user interface (GUI). A computer is communicatively connected to the touch-sensitive graphical display. The computer executed computer readable code stored on a computer readable medium such that the computer receives the list of touch event data points from the touch-sensitive graphical display. The computer identifies at least one icon associated with each touch event data point, identifies a GUI section associated with each identified icon, interprets at least one gesture input from the touch event data points, and produces a control signal in response to the at least one gesture input. A first dispensing system includes a plurality of valves configured to control a flow of at least one diluent and at least one flavor. A second dispensing system includes a plurality of valves configured to control a flow of at least one diluent and at least one flavoring. The computer directs the control signal to the first dispensing system or the second dispensing system based upon the identified GUI section associated with each identified icon.

An exemplary embodiment of a beverage dispenser for concurrent dispense of a first beverage requested by a first user and a second beverage requested by a second user includes a touch-sensitive graphical display which is operable to simultaneously receive a plurality of touch inputs and produce lists of touch event data points representing received touch inputs. The touch-sensitive graphical display is operable to present a graphical user interface (GUI). A computer is communicatively connected to the touch-sensitive graphical display, the computer executes computer readable code stored on the computer readable medium such that the computer receives the list of touch event data points from the touch-sensitive graphical display, identifies a GUI layer common to the touch event data points in each received list, identifies at least a first icon and second icon associated with touch event data points in a received list. The computer identifies a first GUI section associated with the first icon and a second GUI section associated with a second icon and interprets at least a first gesture input from the touch event data points associated to the first GUI section and a second gesture input from the touch event data points associated to the second GUI section. The computer produces a first control signal in response to the first gesture input and a second control signal in response to the second gesture input. A first dispensing system includes a plurality of valves configured to control a flow of at least one diluent and at least one flavoring. The first dispensing system receives the first control signal and operates to dispense the first beverage requested by the first control signal. A second dispensing system includes a plurality of valves configured to control a flow of at least one diluent and at least one flavoring. The second dispensing system receives the second control signal and operates to dispense the second beverage requested by the second control signal.

In a beverage dispenser having a graphical user interface (GUI) including a display and touch-sensitive user selection device, at least a first dispensing system, and a second dispensing system a method of dispensing a beverage includes receiving a list of touch event data points indicative of at least one touch input by at least one user to the GUI. A plurality of icons are presented in the GUI. At least one icon associated with each touch event data point is identified. A first GUI section of the GUI and a second GUI section of the GUI are identified as associated with the identified icons. The touch event data points in the first GUI section are interpreted as a first gesture input. The touch event data points in the second GUI section are interpreted as a second gesture input. A first command instruction is provided to the first dispensing system based upon the first gesture input. A second command instruction is provided to the second dispensing system based upon a second gesture input.

BRIEF DESCRIPTION OF THE DRAWINGS

Examples are described with reference to the following drawing figures. The same numbers are used throughout the figures to reference like features and components.

FIG. 5 is an exploded hierarchical view depicting a plurality of graphical user interface layers presented on the graphical display.

DETAILED DISCLOSURE

Figure 1:
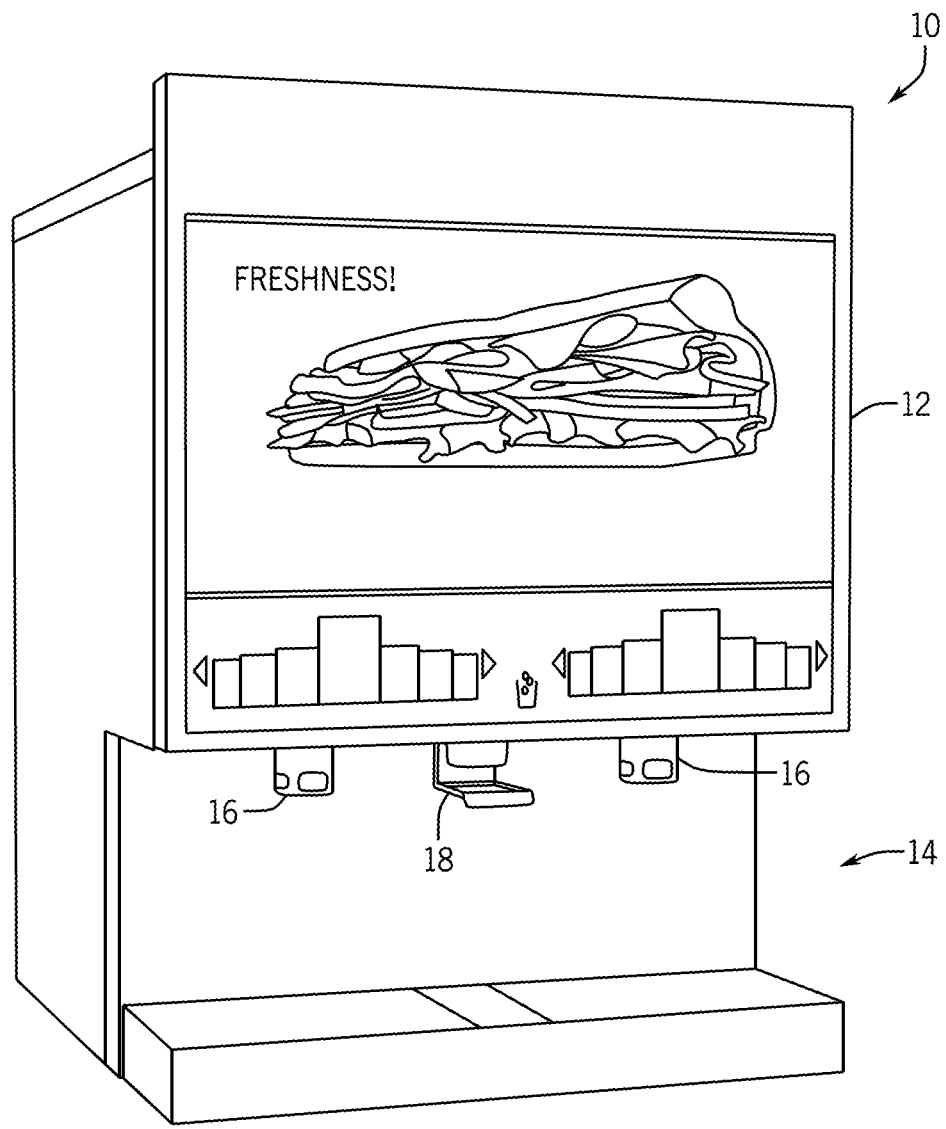
FIG. 1 is a perspective view of an exemplary embodiment of a beverage dispenser.

Through research and experimentation, the present inventors have realized that it would be beneficial to provide a beverage dispensing machine having multi-touch control dispense nozzles which are reactive to multi-touch inputs received via a touch-sensitive display screen, exemplarily a liquid crystal display (LCD). Through research and development, the present inventors have also recognized that it would be desirable to provide a unit that concurrently and/or simultaneously dispenses from two or more nozzles receiving such inputs at the touch-sensitive display screen.

In the present disclosure, "simultaneously" and "concurrently" are used to reflect the relative timing of events. "Simultaneously" refers to a timing of events that occur at the same time, for example, two users press the touch-sensitive display in a touch gesture at the same time or within a refresh rate of the list of touch event data points described in further detail herein. "Concurrently" refers to a timing of events in which the events each have a time duration and over at least a portion of that duration there is overlap between the two events, for example, the beverage dispenser begins dispense of a beverage from the first nozzle, then during that dispense, begins dispense of a beverage from the second nozzle. It will further be understood that a "simultaneous" timing of events is a special case of a "concurrent" timing of events.

In embodiments, arrangements and methods of operation are provided to decipher concurrent inputs by two or more different users into a single touch-sensitive display screen, so the arrangements can provide concurrent dispenses based upon concurrent and/or simultaneous selections and/or pour inputs. In embodiments, digitizers provide the necessary data packaging from the touch-sensitive graphical display and such data from the digitizer is converted into commands that are used by at least one controller in a beverage dispensing machine to accomplish the above-highlighted objectives. The touch-sensitive graphical display can be connected directly or indirectly to at least one computer or controller, exemplarily a single board computer (SBC). One example of such connection is a low voltage differential signaling (LVDS) connection, which may be used to drive the display to put the graphics on the screen and to return the list of touch event data points to the computer. A digitizer can be connected between the touch-sensitive graphical display and the computer to identify and compile touch event data and provide this data to the computer. In an embodiment, the digitizer is specially configured as disclosed in further detail herein to interpret multiple touch events simultaneously occurring on the touch-sensitive graphical display. The computer can exemplarily be configured in a number of ways and with various operating systems, including, but not limited to WINDOWS, UNICES, LINUX-type systems, UMBUNTU, FEDORA, and KUBUNTU and others as may be recognized by one of ordinary skill in the art.

In embodiments, the computer interprets the received touch event data as user input signals and selections in the manners as will be explained in further detail herein. The computer then communicates with multi-flavor valve (MFV) boards developed to operate to control a plurality of valves to provide dispense of a selected beverage including multiple beverage constituents through a single nozzle. As disclosed in further detail herein, in embodiments the MFV board operates to control the dispense, including, but not limited to sequencing of the valves to ensure that carry over is minimized and that a correct ratio of all of the constituent products that make up the beverage are provided.

Further details of the present disclosure will become apparent through the following description of exemplary embodiments.

FIG. 1 is a perspective view of an exemplary embodiment of a beverage dispenser 10. The beverage dispenser 10 includes a touch-sensitive graphical display 12 as will be described in further detail herein, and which operates to present a graphical user interface (GUI) with a plurality of different functional sections. As explained in further detail herein, each of the plurality of functional sections may be represented by a different layer in the GUI encompassing similar non-overlapping sections.

The beverage dispenser 10 includes a dispensing area 14 that is configured to simultaneously dispense at least two beverages. The dispensing area includes a plurality of nozzles 16 through which a selected beverage is dispensed. In an exemplary embodiment of the beverage dispenser 10 depicted in FIG. 1, the dispensing area 14 includes two nozzles 16, although it will be recognized that in other embodiments, more than two nozzles 16 may be present. The dispensing area 14 further includes an ice dispenser 18. Various types and configurations of ice dispensers known in the art may be exemplarily used in embodiments as disclosed herein, including, but not limited to, "drop in" style ice dispensers. As will be described in further detail herein, in one embodiment, the ice dispenser 18 will be actuated by a lever 20 as depicted in FIG. 1 or in another embodiment may be actuated by a touch input into the touch-sensitive graphical display 12 as will be described in further detail herein.

Figure 2:
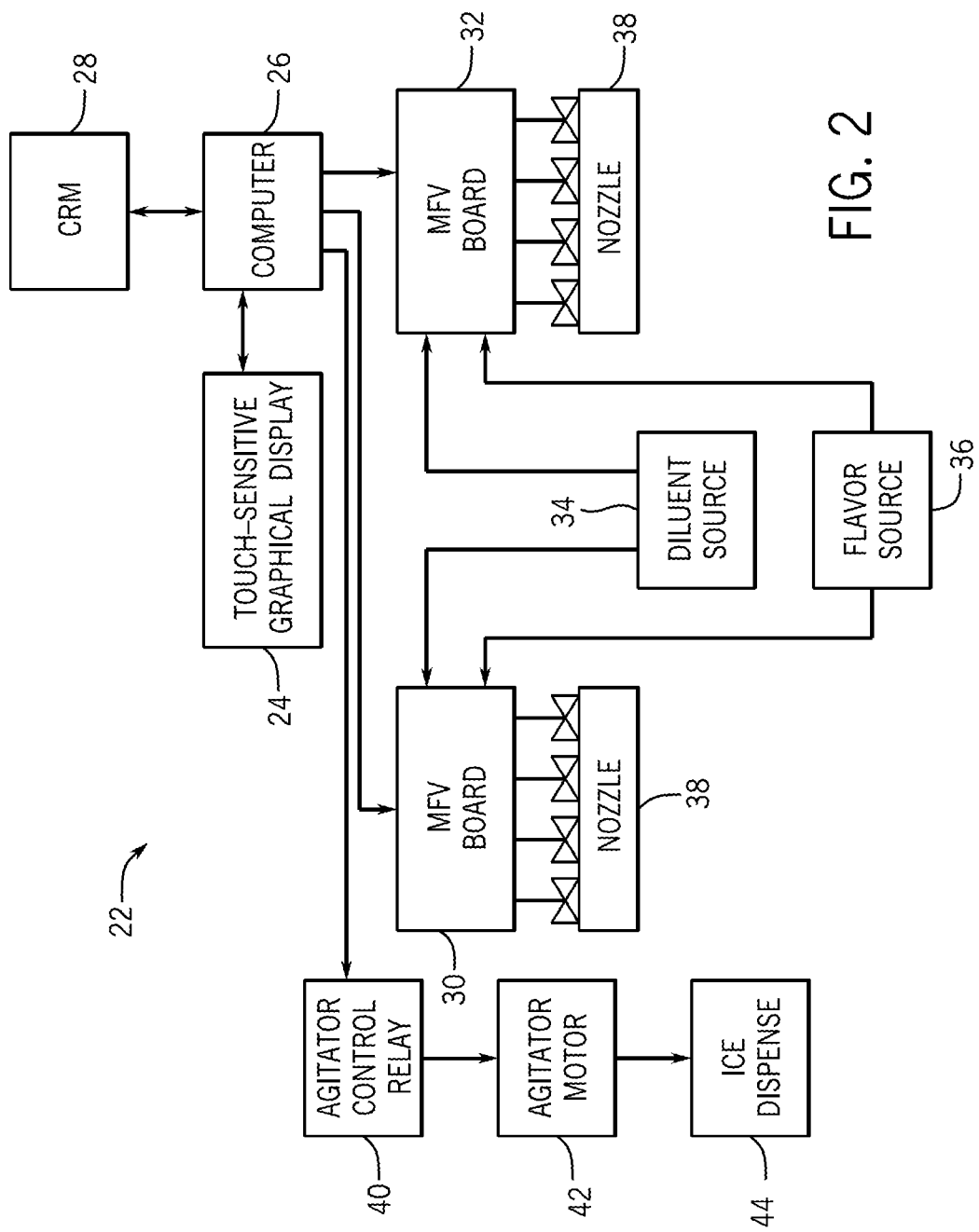
FIG. 2 is a system diagram of an exemplary embodiment of a beverage dispenser.

FIG. 2 is a system diagram of an exemplary embodiment of a beverage dispenser 22. It will be understood that in an embodiment, the beverage dispenser 22 as depicted in system form may be incorporated into the beverage dispenser 10 as depicted in FIG. 1, although the beverage dispenser 22 may alternatively take other physical forms not depicted in FIG. 1.

While not depicted in FIG. 2, exemplary embodiments of the beverage dispenser are electrically powered and the beverage dispenser 22 may be configured with appropriate connections and converters to handle any international electricity standard. In exemplary embodiments, the beverage dispenser 22 may be configured to receive 120, 130, or 240 VAC at 50/60 Hz mains electricity. Exemplary embodiments of the beverage dispenser may include a power supply that converts the electrical mains to electrical power suited for the operation of various components including, but not limited to 24 VDC.

The beverage dispenser 22 includes a touch-sensitive graphical display 24. In a non-limiting and exemplary embodiment, the touch-sensitive graphical display 24 is exemplarily a projected touch capacitance (PTC) multi-touch screen. The touch-sensitive graphical display 24 includes a digitizer that outputs a real time list of touch event data, identifying any touch events sensed by the touch-sensitive graphical display. In an exemplary embodiment, this touch event data is output in a list. Such list is updated in real time or near real time at a refresh rate of the digitizer and/or touch-sensitive graphical display. In an embodiment the list includes up to ten points of touch event data. In other exemplary embodiments, this list may include more points of touch event data, for example, but not limited to, 50 points or more of touch event data. In an exemplary embodiment, the list of touch event data points only identifies points in which a change in touch state (touch or no touch) has occurred.

The touch event data is provided from the digitizer of the touch-sensitive graphical display 24 to the computer 26 which is exemplarily a single board computer (SBC). In one non-limiting embodiment, the computer 26 is an Aaeon EMB-9459 Single Board PC with an Ubuntu operating system.

The computer 26 exemplarily includes a computer readable medium 28 or otherwise is communicatively connected to a computer readable medium 28. Computer readable code is stored on the computer readable medium 28 in the form of software and/or applications that upon execution by the computer 26 perform various functions as disclosed in further detail herein. In operation, the computer 26 receives the touch event data points from the touch-sensitive graphical display 24 and parses the touch event data points to identify and allocate touch events between various layers and sections within the graphical user interface presented on the touch-sensitive graphical display 24.

Figure 4:
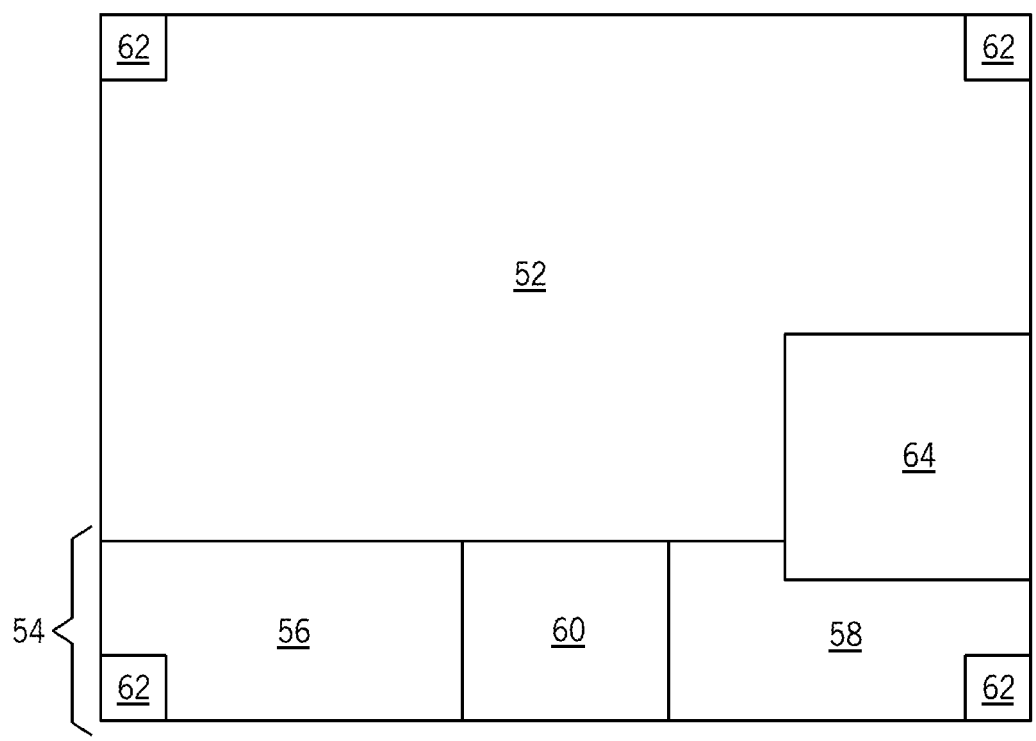
FIG. 4 depicts an exemplary embodiment of a graphical user interface presented on a graphical display.

In an exemplary embodiment, the computer 26 operates the touch-sensitive graphical display 24 to present a GUI as exemplarily depicted in FIG. 4 as a plurality of layers comprising a plurality of sections shown in FIG. 4 and as exemplarily depicted in an exploded and hierarchical view in FIG. 5. The controller operates in the manners as disclosed herein to associate particular touch events in the touch event data points between the layers, GUI sections within layers, user input options presented to the user or users in those sections to handle concurrent use of the beverage dispenser by more than one user. Referring to FIGS. 4 and 5, the GUI 50 in embodied in a Layer 0. A media section 52 and a user section 54, are embodied in a Layer 1. Additionally, the user section 54 is further represented by a first beverage selection section 56 and a second beverage selection section 58 making up a Layer 2. An ice dispense section 60 may be optionally included in the user section 54.

Optional first and second configurations (66, 68) of the first and second beverage selection sections (56, 58) make up a Layer 3.

Referring back to FIG. 2, the computer 26 operates to allocate the touch events from the received touch data exemplarily between the first beverage selection section 58, second beverage selection section 58, and ice dispense section 60 of the user section 54 and interpret those allocated touch events into commands to respective dispensing controls as described in further detail herein.

The beverage dispenser 22 includes a first dispensing unit including a first multi-flavor valve (MFV) board 30, a plurality of flow valves and a nozzle 38. The beverage dispenser further includes a second dispensing unit including a second MFV board 32, a plurality of flow valves and a nozzle 38. The computer 26 provides instructional commands respectively to the first MFV board 30 and second MFV board 32 based upon touch events respectively allocated to the first beverage selection section 56 and second beverage selection section 58. The respective MFV boards 30, 32 exemplarily include SBC's that interpret the commands from the computer and translate these commands to operation of a plurality of valves associated with the MFV boards 30, 32 to dispense a plurality of beverage components, including at least one diluent from a diluent source 34 and at least one flavoring from a flavor source 36. In an exemplary embodiment, the diluent source 34 provides a plurality of available diluents including, but not limited to still water and carbonated water, including varieties of water with one or more levels of carbonation. In exemplary embodiments, the flavor source 36 provides a plurality of beverage flavorings and additives, including, but not limited to, flavored syrups and other flavor extracts. In embodiments, the flavorings in the flavor source 36 may include syrups for branded beverages (e.g. PEPSI and COKE) and supplemental flavors (e.g. vanilla, cherry, lime, etc.).

In an exemplary embodiment, the MFV boards are exemplarily configured to control the dispense of up to four diluents, 16 branded beverage syrups, and eight flavor extracts; however, these are merely intended to be exemplary and are not intending to be limiting on the numbers and types of controlled dispenses by the MFV boards. The MFV boards operate to convert the instructions from the computer 26 into operations of the appropriate flow valves in a selected combination of diluent and flavoring to dispense the diluent and flavoring through a common nozzle 38. In the exemplary embodiment depicted, the first MFV board 30 and the second MFV board 32 are both directly communicatively connected to the computer 26. However, in alternative embodiments, such as exemplarily depicted in FIG. 3, MFV boards may be connected in a ganged or series configuration, which may facilitate the implementation of a plurality of dispensing systems including three or more dispensing units within the beverage dispenser 22 beyond the two dispensing units depicted in FIG. 2.

In the exemplary embodiment of the beverage dispenser 22 the computer 26 is further communicatively connected to the agitator control relay 40 of an ice dispenser. The agitator control relay 40 receives a command instruction from the computer 126 to dispense ice. In an exemplary embodiment, the computer 26 provides this command instruction to the agitator control relay 40 after interpreting at least one touch event as being associated with a user input of an ice dispense selection within the ice dispense section 60 exemplarily depicted in FIG. 4.

The agitator control relay 40, upon this instruction, operates an agitator motor 42 to move a supply of ice and opens an ice dispense port 44, exemplarily configured with a gate, to dispense ice therethrough. Upon release of the input or after a predetermined amount of time has run from the received input, the ice dispense port 44 is closed and the agitator motor 42 has stopped.

Figure 6A:
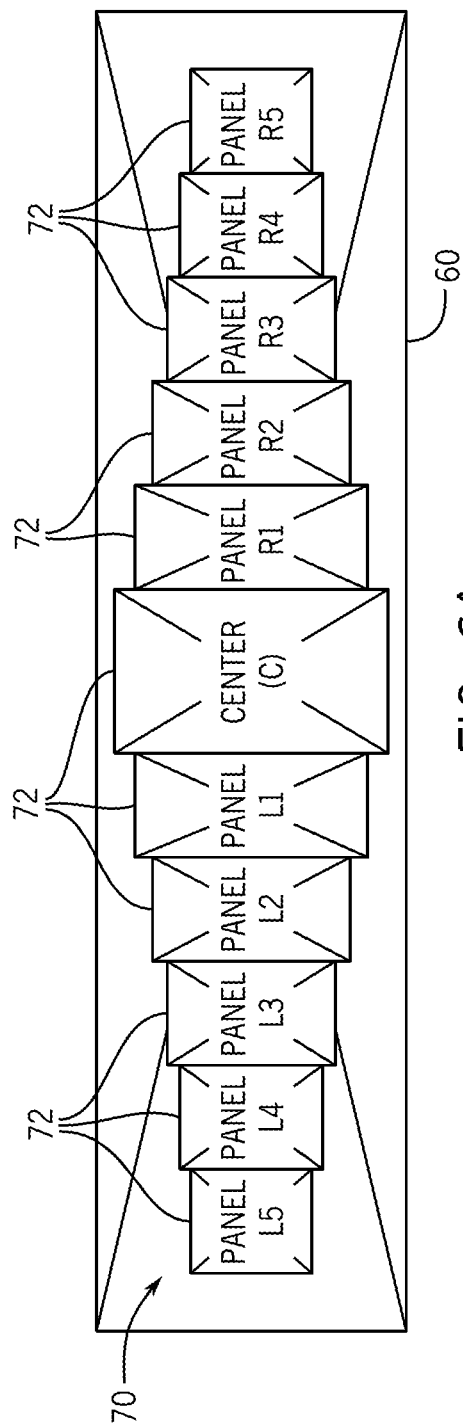
FIG. 6A depicts an exemplary embodiment of a first configuration of a beverage selection graphical user interface.
Figure 6B:
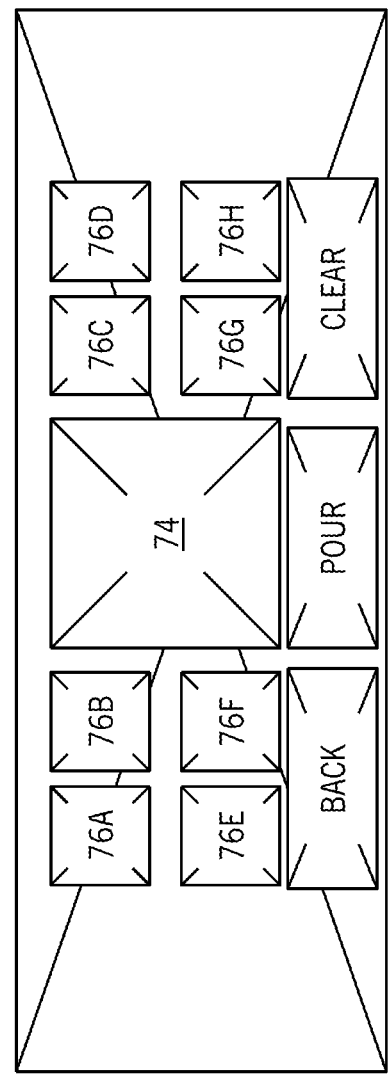
FIG. 6B depicts an exemplary embodiment of a second configuration of a beverage selection graphical user interface.

FIG. 6A depicts an exemplary embodiment of a first configuration 66 of a beverage selection section 56, 58. FIG. 6B depicts an exemplary embodiment of a second configuration 68 of the beverage selection section 56, 58. The first configuration 66 of the beverage selection section is exemplarily configured as a carousel 70 that presents a plurality of beverage icons 72 of available branded beverages or custom or proprietary beverages for user selection. The system is operable to recognize various user inputs allocated to the beverage selection sections. Exemplarily, the computer is operable to interpret "flick", "tap", and "touch and hold" gesture inputs as well as an absence of inputs for a predetermined length of time. In an exemplary embodiment, a "flick" gesture is interpreted as a time sequence of touch event data points embodying a series of points directionally moving away from a start point. Identification by a computer of such a flick gesture in a generally right or left direction within a beverage selection section results in the computer sending command instructions to the touch-sensitive graphical display to cycle the series of presented beverage icons 72 in the carousel 70 to move one of the beverage icons 72, which may be branded beverage icons (e.g. PEPSI or COKE) to various positions within the carousel 70. In an exemplary embodiment, the carousel 70 is configured to present only a predetermined number of beverage icons 72 and in a further embodiment, a predetermined odd number of beverage icons 72 such that a single beverage icon 72 can hold a center position of the carousel 70 within the beverage selection section.

A "tap" gesture may be interpreted by the computer upon receiving a short time sequence of touch event data points at a series of localized points sequentially followed by a release event of those same points. A "tap" on the beverage icon 72 in the center position results in the selection of that beverage and the computer operates the touch-sensitive graphical display to present the beverage selection section in the second configuration 68. If a "tap" gesture is interpreted in association with any of the other beverage icons 72 in the carousel 70 then the computer still operates to present the second configuration as described above, but also internally stores the selected beverage icon 72 in the computer memory such that when navigation returns to the first configuration of the beverage selection section, the previously selected beverage icon 72 is at the center position in the carousel 70.

In the second configuration 68 of the beverage selection section, an icon 74 is presented of the selected beverage previously selected from the first configuration 66 of the beverage selection section. The second configuration 68 further presents a plurality of supplemental flavor icons 76A-H which present a plurality of optional supplemental flavors or additives to the selected beverage. Non-limiting examples of such flavors may include cherry, grape, lemon, lime, orange, vanilla, mint, basil, and cinnamon, although other flavors will be recognized by a person of ordinary skill in the art. Additionally, the second configuration 68 further presents control button icons including a back button icon 78, a pour button icon 80, and a clear button icon 82.

When the graphical user interface is operated by the computer to present the beverage selection section in the second configuration, the computer can operate to interpret "tap" gesture and "tap and hold" gestures from the touch event data points received by the computer. A "tap" event may be interpreted as explained above, while a "touch and hold" event may be determined by a predetermined minimum length of time elapsing between a touch event detected at particular points before a release event is detected at the same points. In operation, the user inputs one or more tap gesture inputs on one or more of the flavor icons 76A-H. Upon selection of one or more of the icons, computer may operate the graphical display to change the selected icons to highlight or otherwise indicate that such flavor has been selected for incorporation into the selected beverage, again as indicated by the selected beverage icon 74. User selection of the back button icon 78, exemplarily with a tap gesture upon the back button icon 78 results the computer controlling the touch sensitive graphical display to present the first configuration 66 of the beverage selection section, with the beverage icon of the previous selected beverage centered on the carousel. A user selection of the clear button icon 82 exemplarily with a tap gesture can clear the presented second configuration from any selections of flavor icons 76A-H.

The pour button icon 80 is exemplarily operated by the user with a "touch and hold" gesture whereby the user holds their finger against the pour button icon 80 for the general duration of the time that the selected beverage and supplemental flavors are dispensed from the nozzle. Referring back to FIG. 2, there are various manners in which the computer 26 and the MFV boards 30, 32 may interact. In one embodiment, the computer saves each of the beverage selections and supplemental flavor selections in a memory of the computer until the user selects the pour button icon, after which, the entire beverage request is sent to the appropriate MFV board. In an alternative configuration, the computer updates an instruction to the appropriate MFV board with each selection made by a user such that by the time that the user selects the pour button icon, the entire beverage order has been provided to the MFV board and is stored at the MFV board.

In an exemplary embodiment, once the computer identifies a touch down event associated with a pour button icon of one of the beverage selection sections, the computer provides a dispense signal to the associated MFV board. In still further exemplary embodiments, the dispense signal is a dispense signal requesting a dispense by the MFV valve for a predetermined length of time. In an exemplary and non-limiting embodiment, this predetermined length of time may be for 25.5 seconds (255 ds). However, upon detection of a release event at the pour button icon of the beverage selection section, the controller provides a second instruction signal to the MFV valve to terminate the previously requested dispense. This has the practical effect to the user of dispensing the requested beverage for the duration that the user is pressing the pour button icon 80, but also provides a built in safe guard in the event that a subsequent termination signal is not provided that the MFV board will only operate the valve to dispense for a total of the predetermined length of time rather than continuing to dispense beverage.

Figure 3:
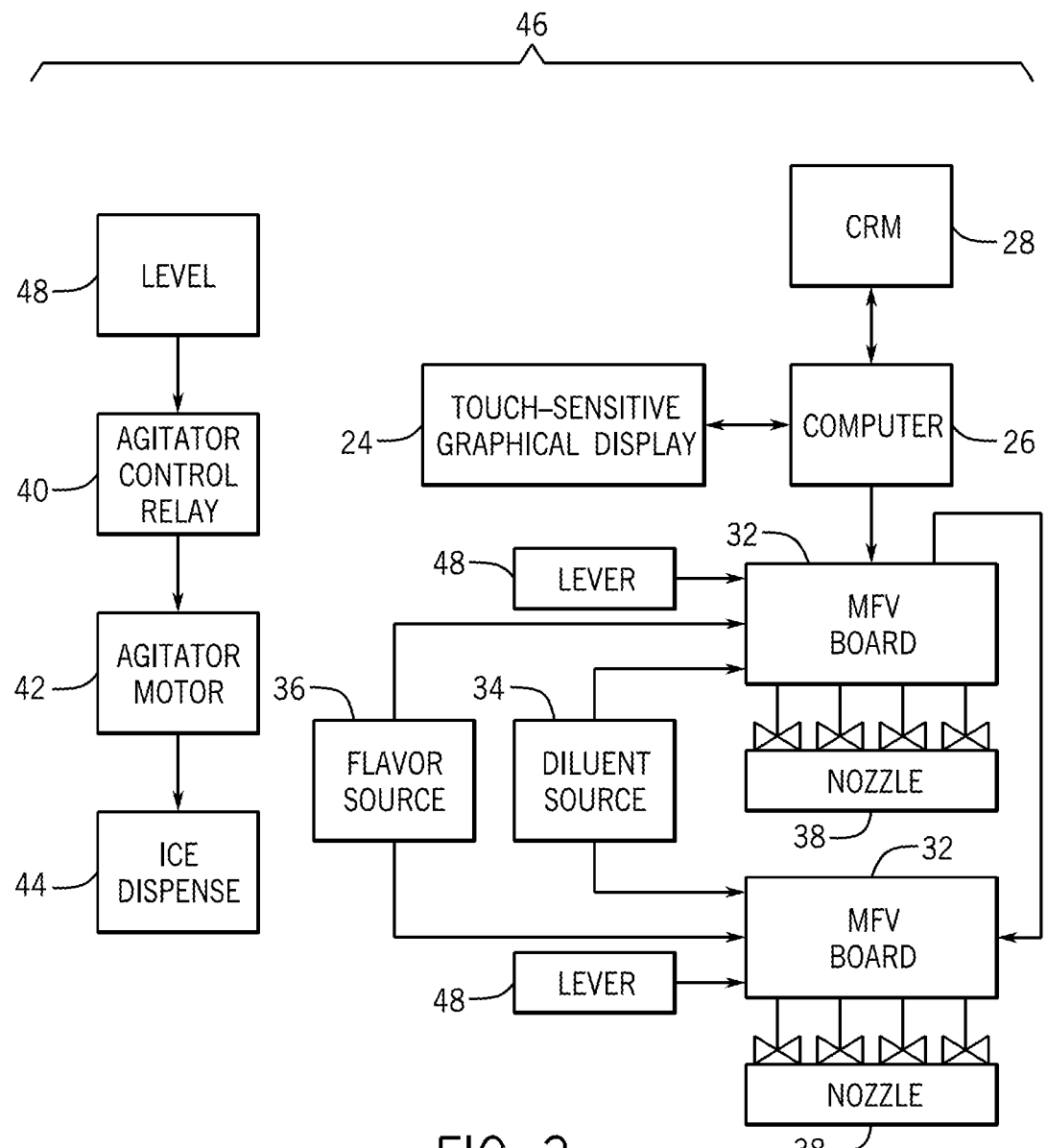
FIG. 3 is a system diagram of an additional exemplary embodiment of a beverage dispenser.

FIG. 3 is a system diagram of an additional exemplary embodiment of a beverage dispenser 46. It will be recognized that in the system diagram of FIG. 3, like reference numerals between FIGS. 2 and 3 are used to denote similar structures for the purpose of clarity and conciseness in the present disclosure. The beverage dispenser 46 of FIG. 3 exemplarily depicts an embodiment wherein a communicative connection exists between the first MFV board 30 and a second MFV board 32 in a series or ganged communication scheme. In such an embodiment, command instructions from the computer 26, intended for the second MFV board 32, are provided to the first MFV board 30 before being relayed to the second MFV board 32. Such an exemplary embodiment can facilitate the implementation of a beverage dispenser in either of the configurations otherwise depicted in FIGS. 2 and 3 that includes more than two dispensing units.

Additionally, the beverage dispenser 46 depicts an embodiment wherein each of the ice dispenser 18, first MFV board 30, and second MFV board 32 are actuated for a dispense of either the ice or a selected beverage by a manual lever 48. Exemplarily, the lever 48 may be physically associated with the respective nozzle 38 or ice dispense port 44 and a user of the beverage dispenser 46 actuates the lever 48 with a cup to initiate dispense of the ice or beverage. In such an embodiment, a user or users may use the beverage selection sections in the GUI to select a beverage and any supplemental flavors, the selection of which is provided to the associated MFV board. However, the dispense of the beverage is intended and controlled by actuation of the associated manual lever 48.

It will be recognized that in alternative embodiments combinations of the features depicted in FIGS. 2 and 3 may be incorporated together while remaining within the scope of the present disclosure. Therefore, in alternative embodiments, the pour command for one or more of the ice dispenser or beverage dispensing units may be input by the user or users through the touch screen and/or may be input from actuation of a manual lever.

Figure 7:
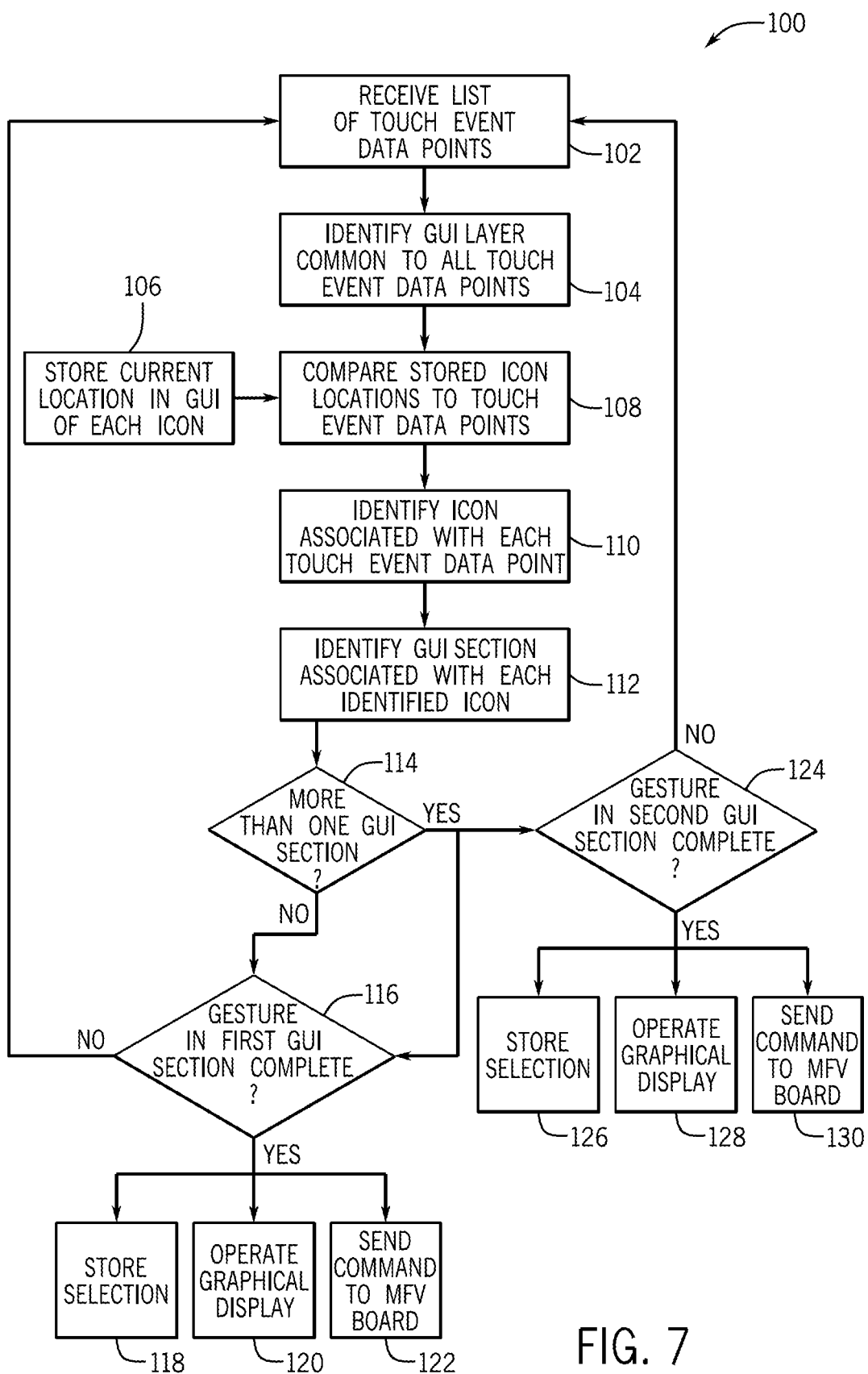
FIG. 7 is a flow chart that depicts an exemplary embodiment of a method of dispensing a plurality of beverages.

FIG. 7 is a flow chart that depicts an exemplary embodiment of a method 100 of dispensing a plurality of beverages from multi-touch inputs of a plurality of users. As presented above, a problem exists in the field wherein a touch-sensitive input device outputs touch event data as a list of touch event data points embodying a single touch event. While that current arrangement facilitates and makes possible the detection of complex multi-touch gestures such as grip, pinch, and rotate gestures, it also creates a barrier to the use of a touch sensitive user interface to collect multiple concurrent user inputs. These problems have resulted in the need for dedicated separate user input devices including buttons, levers, and/or touch-sensitive displays for each dispensing system in a multi-dispensing system dispenser. The problems identified by the inventors are overcome by embodiments of the method 100 as described in further detail herein.

At 102 a list of touch event data points is received. Exemplarily, this list of touch event data points is received from a digitizer of a touch-sensitive graphical display, as described above, and is received by a computer of the beverage dispenser. As previously described, the list of touch event data points may be output and received at the refresh rate of the digitizer.

As mentioned above, the digitizer and the operating system of the computer seek to interpret this list as a single touch event. Therefore, at 104 a GUI layer encompassing all of the touch event data points in the received list of touch event data points is identified. Referencing back to FIG. 5, the GUI 50 is broken into a series of layers (Layer 0-Layer 3) with each layer including at least one non-overlapping GUI section. The GUI is arranged in a hierarchy of layers wherein GUI sections residing in a subsequent layer are encompassed by the GUI section of a superior layer. In practice the GUI 50 is constructed by stacking the layers sequentially upon one another, exemplarily with Layer 0 at the back and Layer 3 on the top. Exemplarily, the presentations of the first configuration 66 and second configuration 68 of the beverage selection sections comprise Layer 3, while the beverage selection sections 56, 58 themselves are each common to both of the first configuration 66 and second configuration 68 and therefore embody Layer 2. The user section 54 is common to both of the beverage selection sections 56, 58 and therefore embodies Layer 1. A content section 52 is also exemplarily located in Layer 1. Layer 0, embodied by the entire GUI 50 space, is common to both the content section 52 and the user section 54 of Layer 1.

Therefore, according to such a hierarchy, the most superior layer (e.g. largest layer) required to encompass all of the touch event data points in the received list is identified. It will be recognized that in FIG. 5 more sections may be present in alternative embodiments, including, but not limited to an ice dispense section and still further beverage selection sections.

At 106 a current location within the GUI of each icon presented in the various sections of the GUI is stored. This may exemplarily be stored at a computer readable medium associated with the computer of the beverage dispenser. This location information may further be stored in conjunction with the computer operating the touch-sensitive graphical display, or providing the touch-sensitive graphical display with operation instructions to present the GUI along with any associated icons.

At 108 the stored icon locations are compared to the touch event data points. The comparison of the stored icon locations to the touch event data points at 108 enable an icon associated with each touch event data point to be identified at 110. In exemplary embodiments, all of the touch event data points may be associated with a single icon, such as in the event of all of the touch event data points being associated with a single touch event. Although it is to be recognized that in other instances, a plurality of different icons associated with touch event data points may be identified, particularly when multiple users are providing touch inputs to the GUI in the concurrent dispense of multiple beverages from the beverage dispenser. In a still further example, a user inputting a flick gesture within a single beverage selection section may result in touch event data points being associated with one or more icons due to the nature of the gesture.

At 112 a GUI section associated with each identified icon is identified. As noted above, in some instances one or more identified icons may be associated with a single GUI section. For example, a first beverage selection section in a first configuration may receive a "flick" gesture which results in one or more lists of touch even data points with data points associated with two adjacent icons as the user's finger moves. In other instances, the identified icons may reside in two or more different GUI sections, exemplarily within a first beverage selection section and a second beverage selection section.

At 114 a determination is made if more than one GUI section is identified. In general, the beverage dispenser operates to create a plurality of GUI sections which are interpreted as independent multi-touch user interfaces within a single touch-sensitive graphical display. If all of the identified icons are located within one GUI section, then at 116 a decision loop is created as to whether or not a gesture in a first GUI section containing the at least one identified icon is complete.

In embodiments, gesture inputs typically occur over a length of time and therefore are detected across a plurality of received lists of touch event data points. Also within embodiments, a complete gesture includes a touch down event and a release. While action or operational control may occur starting with detection of a touch down event of a gesture, the gesture is completed after a release event is detected. In embodiments, this presents an additional challenge as often touch-sensitive graphical displays (and associated digitizers) may only include changes in touch (e.g. capacitive state) detected by the touch-sensitive graphical display. Therefore, in an example, where a user is inputting a "touch and hold" gesture input, gesture input may appear in the list of touch event data points during the touch down event portion, followed by subsequent lists of no touch event data points related to this gesture, followed by a list containing touch event data points indicating the release event completing the gesture. The method 100 continues in the manner as described previously and as described in further detail herein until the gesture is complete at 116. Completion of the gesture at 116 may result in any of a number of operational commands, controls, or actions taken by the computer, including, but not limited to storing a user selection at 118, operating the graphical display at 120, or sending a command to the MFV board at 122.

In an exemplary embodiment of a user selection of a branded beverage or a supplemental flavor, after completion of the tap gesture on the associated icon the computer may store the user's selection of this flavor at 118. Concurrent to this storing of the user's selection, the computer may operate the graphical display at 120 to update the graphical display to reflect the user's selection. In an exemplary event of a beverage selection in the first configuration of the beverage selection section, the computer may operate the graphical display to change the beverage selection section from the first configuration to the second configuration as described above. In the event of a selection of a supplemental flavor, the computer may operate the graphical display to change the associated flavor icon to visually indicate that the user has selected the supplemental flavor, for example, by changing a color of the flavor icon.

In the event of a selection of the dispense input, exemplarily through a "touch and hold" gesture input to the pour button icon, the computer sends a command at 122 to the MFV board to begin the dispense of user-selected beverage. Along with the dispense command, the computer may send the stored selections of branded beverage and any additional flavoring requested by the user. It will be recognized, that in the exemplary embodiment, that the one or more commands (e.g. to initiate dispense and/or provide the selected beverage) may be sent to the MFV board upon initiation of the "touch and hold" gesture exemplarily upon a touch down event detection and also upon completion of the "touch and hold" gesture by detection of a release event wherein a cut off or termination command is sent to the MFV board.

As discussed above, when multiple touch inputs are received concurrently and possibly simultaneously, particular challenges arise in accurately parsing these inputs and translating them into the proper operational commands and functionality of the beverage dispenser. If, at 114, more than one GUI section has been identified at 112, then the method 100 also begins a decision loop at 124 to interpret if a gesture in the second GUI section is complete. Similar to that of the gesture in the first GUI section described previously, the decision loop continues across a plurality of received list of touch event data points and is processed in the manner as disclosed above. The completed gestures in the second GUI section can result in storing a user selection at 126, operating the graphical display at 128 and sending a command to an MFV board at 130 in similar manners as described previously with respect to these actions in connection with the first GUI section.

Two examples are herein provided to highlight exemplary situations in which the method 100 and beverage dispensers disclosed herein find particular advantage over previous solutions. In a first example, two users simultaneously make beverage selections using tap inputs to respective icons in the first beverage selection section and the second beverage selection section. This results in a list of touch event data points that includes data points in two different GUI sections related to two different gesture inputs by two different users. The method as described herein operates to parse these touch event data points into the two simultaneously received gestures for accurate operation of the beverage dispenser.

In a second example, a first user initiates a dispense of a beverage by beginning a touch and hold gesture input to a pour button icon. Concurrent to the first user holding the dispense icon, a second user begins a flick gesture in a second beverage selection section. Concurrent to the flick gesture, the first user releases the touch and hold input. In this example, with reference to FIG. 5, the initiation of the touch and hold input by the first user is received in Layer 3, specific to the configuration of the first beverage selection section; however, due to the concurrent receipt of the flick gesture in the second beverage selection section, the release of the touch and hold gesture is received in Layer 1 which is common to both the first beverage selection section and second beverage selection section. Therefore, the method 100 and the beverage dispenser are able to identify and interpret a gesture input initiated in a first GUI layer while completed in a different GUI layer.

Figure 8:
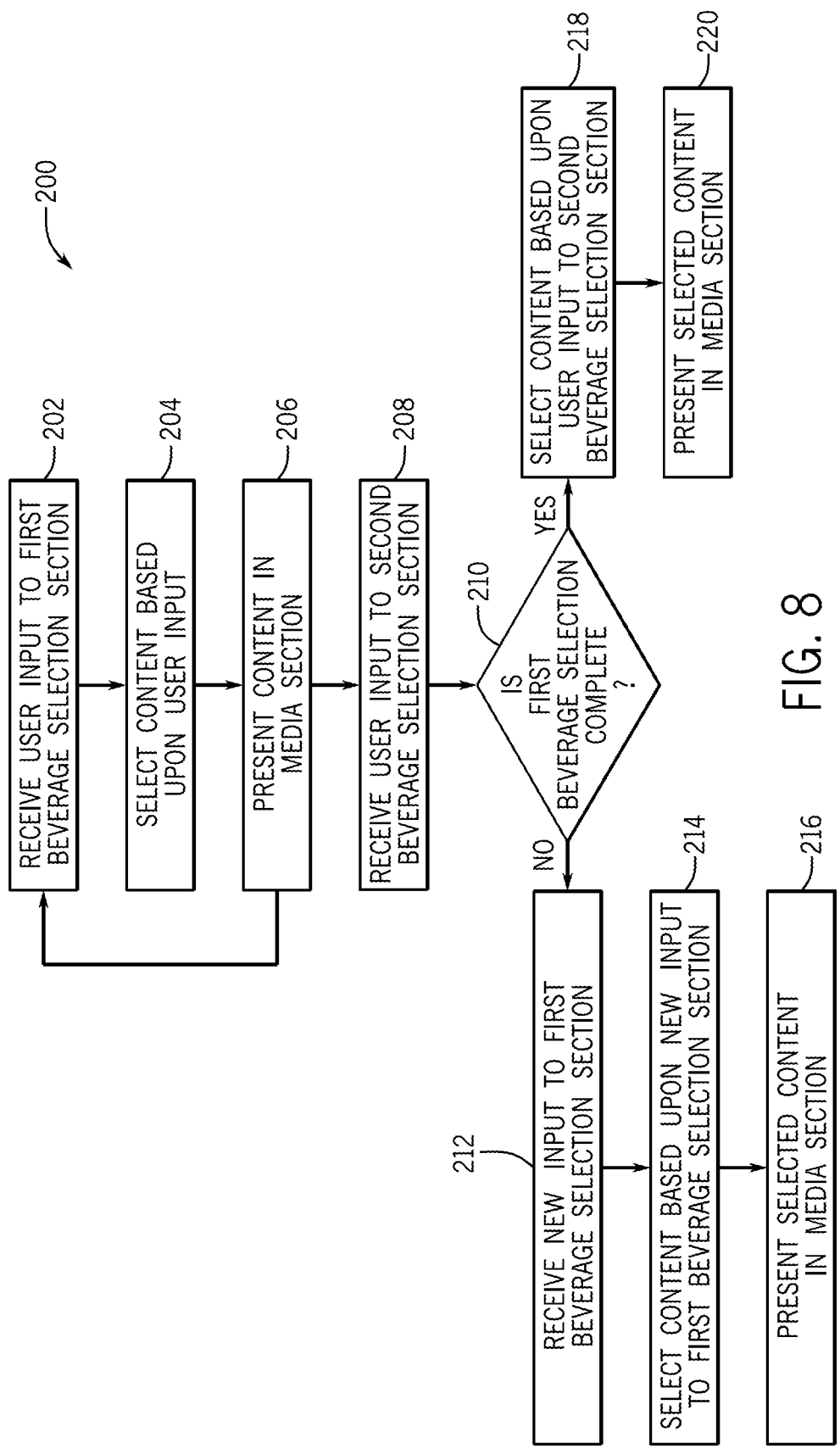
FIG. 8 is a flow chart that depicts an additional exemplary embodiment of dispensing a plurality of beverages.

FIG. 8 is a flow chart that depicts an exemplary embodiment of a method 200 of dispensing at least one beverage. In exemplary embodiments, the method 200 may be performed in connection with the method 100 as previously described and may be performed by the beverage dispenser described in the present application. At 202 a user input is received at a first beverage selection section. The user input may exemplarily be a selection of a branded beverage, a supplemental flavor to the branded beverage or a dispense input. Next, at 204 the computer of the beverage dispenser selects content to be presented in the content section 52 (FIG. 5) based upon the user input. The content may exemplarily by used and/or images. The content and rules or instructions for content selection may be preprogrammed to the computer and may include, but is not limited to, advertisements (e.g. advertisements for a selected branded beverage), promotions (e.g. sales or combination deals related to beverages or particular beverages), suggested "mixology" (e.g. suggested supplemental flavors or combinations of flavors to add to a selected branded beverage), and video or image content (e.g. sports clips or relaxing scenery). The content may be stored at the computer, or in a computer readable medium associated with the computer as well as rules for which content to present in connection with which user selections.

At 206 the selected content is presented in the content section of the GUI on the touch-sensitive graphical display. The presentation of selected content may continue so long as a single user is providing input to the beverage dispenser. At 208 if the beverage dispenser receives a user input to a second beverage selection section, thereby indicating a second concurrent user of the beverage dispenser. Then a determination is made at 210 whether the first user and use of the first beverage selection section is complete. In an exemplary embodiment, the beverage dispenser may determine if the first beverage selection is complete in at least two ways. In one example, the beverage selection section may return to a default or home configuration after the dispense of a beverage. In a second example, which may be used in conjunction with the first method, an inactivity timer measures a length of time since a user input was received within a beverage selection section and if the inactivity timer reaches a predetermined threshold time, the beverage selection is deemed to be complete or otherwise abandoned and the beverage selection section returns to a home or default configuration, which may exemplarily be the first configuration described above.

If the first beverage selection is still occurring and is not complete then at 212 a new input to the first beverage selection section is or has been received and further content can be selected based upon the new input to the first beverage selection section at 214 and the new selected content is presented in the content section at 216. If, at 210, the first beverage selection is complete, then at 218 content is selected based upon the user input to the second beverage selection section and this new selected content is presented in the content section.

It will be recognized that in additional embodiments, when multiple beverage selections are occurring concurrently, that the selection of content may be made based upon the user inputs by more than one of the concurrent users. Additionally, content may further be selected based upon a particular user input based upon where in the beverage selection process, each user is. For example, if a first user is currently dispensing beverage while another user has selected a branded beverage but is selecting supplemental flavors, the content may be selected to present the second user with suggested "mixology" relevant to the actions of the second user while the first user has already made such selections and is in the processing of completing the beverage dispense.

Exemplary embodiments as disclosed herein have still further advantages in particular embodiments. In an exemplary embodiment, the beverage dispenser may be operated in a "crew mode" in which the beverage selection sections are configured for operation by a food service worker to dispense beverages ordered by restaurant customers. In one exemplary embodiment of operation of the beverage dispenser in a crew mode, the dispense of the beverage involves a selection of a cup size and the dispense command provided from the computer to the MFV board is a requested dispense volume or dispense time associated to the selected cup size.

In an embodiment, an Americans with Disability Act (ADA) compliant interface can be provided where the touch-sensitive display is positioned above the height limit according to ADA protocol. In an exemplary embodiment, an ADA interface which can be a capacitive touch, five-button-type interface which an operator may change the user interface to adjust the interface from an embodiment where the inputs are gesture oriented to simpler selection type interface which enables users with disabilities to more easily use the beverage dispenser. In still further embodiments, user interface appearance can be adjusted with skins to result in more setting specific or facility specific appearances.

Advantages of the beverage dispenser and methods as disclosed herein further achieve increased user throughput by enabling multiple users to operate a beverage dispenser concurrently to dispense selected beverages. This may decrease a length of service lines and improve use satisfaction and wait times. Still further embodiments enable dedicated user interfaces for the presentation of multiple beverages and/or brands. For example, a first beverage selection section may be dedicated to the presentation and dispense from a first branded beverages selection (e.g. COKE products) while a second beverage selection section is dedicated to the presentation and dispense of beverages from a second branded beverages selection (e.g. PEPSI products). In still further embodiments, multiple beverage types may be dispensed with a single beverage dispenser as disclosed herein. For example, one beverage selection section is dedicated to the selection and dispense of soft drinks, while another beverage selection section is dedicated to the selection and dispense of teas, juices, and/or smoothies.

In still further exemplary embodiments, the beverage dispenser can include one or more programmable touch-sensitive graphical displays. In such an exemplary embodiment, the beverage dispenser could exemplarily comprise a kiosk of four or five touch-sensitive graphical displays, each supporting multi-touch user inputs by a plurality of users. While a separate beverage dispenser as disclosed herein may be associated with each of the touch-sensitive graphical displays in the system, in an alternative embodiment, a computer and software application may be used to processes the inputs of multiple touch-sensitive graphical displays and the associated operation and control of all of the associated MFV boards.

With further reference to FIG. 4, in an additional exemplary embodiment, the GUI 50 may further include override section 62A-D. These sections exemplarily reside in Layer 0 and in an embodiment are not graphically presented to the user in the GUI 50. Rather, an owner, operator, or technician may know of the existence of such sections and upon the receipt or selection of these sections, exemplarily with a tap input and further exemplarily in a sequential order (e.g. 62A, 62B, 62C, 62D) the computer operates the touch-sensitive graphical display to modify the GUI 50 to visually present an authentication section 64. The authentication section 64 prompts a user to enter an authentication credential, including, but not limited to a passcode. Upon successful input of an accepted passcode the user may be presented with operational settings and/or controls for the beverage dispenser including, but not limited to controls related to the selection of particular beverage icons, available content and content selection rules, or layout in configuration of the beverage selection section.

The functional block diagrams, operational sequences, and flow diagrams provided in the Figures are representative of exemplary architectures, environments, and methodologies for performing novel aspects of the disclosure. While, for purposes of simplicity of explanation, the methodologies included herein may be in the form of a functional diagram, operational sequence, or flow diagram, and may be described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology can alternatively be represented as a series of interrelated states or events, such as in a state diagram. Moreover, not all acts illustrated in a methodology may be required for a novel implementation.

In the present Description, certain terms have been used for brevity, clearness and understanding. No unnecessary limitations are to be implied therefrom beyond the requirement of the prior art because such terms are used for descriptive purposes only and are intended to be broadly construed. The different embodiments described herein may be used alone or in combination with other apparatuses, systems and methods. Various equivalents, alternatives and modifications are possible within the scope of the appended claims.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A beverage dispenser comprising:
a first dispensing system configured to dispense a first plurality of beverages;
a second dispensing system configured to dispense a second plurality of beverages;
a touch-sensitive graphical display operable to simultaneously receive touch inputs from a first user and a second user, the first and second users being different, and the touch-sensitive graphical display operable to present a graphical user interface (GUI);
a computer communicatively connected to the touch-sensitive graphical display, the computer executes computer readable code stored on a computer readable medium such that the computer operates the touch-sensitive graphical display to simultaneously present a first beverage selection section, a second beverage selection section, and a content section in the GUI in a non-overlapping manner, the first beverage selection section associated with the first dispensing system and the second beverage selection section associated with the second dispensing system, the computer receives touch event data points representative of the touch inputs from the touch-sensitive graphical display and associates the touch event data points between the first beverage selection section and the second beverage selection section, the computer then interprets a first gesture input from the first user from touch event data points associated with the first beverage selection section and a second gesture input from the second user from the touch event data points associated to the second beverage selection section, and produces a first control signal to the first dispensing system in response to the first gesture input and a second control signal to the second dispensing system in response to the second gesture input.

2. The beverage dispenser of claim 1, wherein the computer operates the touch-sensitive graphical display to present content in the content section based upon the touch inputs from at least one of the first user or the second user.

3. The beverage dispenser of claim 2, wherein the content is selected from instructions, images, videos, selection suggestions, and advertisements.

4. The beverage dispenser of claim 3, wherein the computer selects the content to present in the content section based upon the touch inputs of the first user.

5. The beverage dispenser of claim 4, wherein upon receipt of touch inputs from the second user, the computer selects the content to present in the content selection section based upon the touch inputs of the second user.

6. The beverage dispenser of claim 4, wherein the computer operates the touch-sensitive graphical display to present content in the content section based upon the touch inputs from the first user until the first control signal is sent to the first dispensing system, then the computer operates the touch-sensitive graphical display to present content in the content section based upon the touch inputs from the second user.

7. The beverage dispenser of claim 2, wherein upon a predetermined period of time since any received touch inputs from the first or second user, the computer operates the touch-sensitive graphical display to present default content in the content section.

8. The beverage dispenser of claim 1, wherein the touch-sensitive graphical display comprises a digitizer that produces a list of touch event data points representing received touch events sensed by the touch-sensitive graphical display and the computer receives the list of touch event data points and associates the touch event data points from the list between the first input section and the section input section.

9. The beverage dispenser of claim 1, wherein the touch events sensed by the touch-sensitive graphical display are changes in touch state of the data points.

10. The beverage dispenser of claim 1, wherein the computer operates the touch-sensitive graphical display to further present an ice selection section in the GUI simultaneously to the presentation of the first beverage selection section, the second beverage selection section, and the content section in the GUI, and the computer associates the touch event data points between the first beverage selection section, second beverage selection section, and the ice selection section and then interprets a third gesture input from touch event data points associated with the ice selection section and produces a third control signal in response to the third gesture input.

11. The beverage dispenser of claim 10, further comprising an ice dispensing system that receives the third control signal from the computer and operates to dispense ice upon receipt of the third control signal.

12. The beverage dispenser of claim 1 wherein the GUI further comprises a plurality of override sections, wherein the override sections of the plurality are hidden from visual perception such that the content section, the first beverage selection section, and the second beverage selection section are visible through the plurality of override sections.

13. The beverage dispenser of claim 12, wherein the computer receives touch event data points representative of touch inputs to the override sections and the computer associates the touch event data points to the override sections, wherein the computer determines an order of the user touch inputs to the override sections and upon selection of a predetermined order of override sections, the computer operates to present operational settings and controls of the beverage dispenser.

14. The beverage dispenser of claim 1, wherein the first beverage selection section presents a plurality of beverage selection options in a carousel configuration, wherein the computer interprets a flick gesture from the touch event data points associated with the first beverage selection section, and in response to the first gesture input, the computer operates the touch-sensitive graphical display to rotate the plurality of beverage selection options in the carousel configuration.

15. The beverage dispense of claim 14, wherein the computer interprets a tap gesture from the touch event data points associated with the first beverage selection section, and the computer operates the touch-sensitive graphical display to return the carousel configuration to a home position.

16. In a beverage dispenser having a graphical user interface (GUI) presented on a touch-sensitive graphical display, and at least a first dispensing system and a second dispensing system, a method of dispensing a beverage, the method comprising:
- presenting a first GUI section within the GUI, the first GUI section being associated with the first dispensing system and comprising a first GUI icon;
- presenting a second GUI section within the GUI, the second GUI section being associated with the second dispensing system and comprising a second GUI icon;
- presenting a content GUI section within the GUI, the content GUI section being non-overlapping to the first GUI section and the second GUI section;
- receiving a plurality of touch event data points from the touch-sensitive graphical display, the plurality of touch event data points comprising a first user input from a first user to the GUI presented on the touch-sensitive graphical display;
  - identifying the first GUI icon or the second GUI icon presented in the GUI associated with the touch event data points;
- associating the touch event data points to at least one of the first GUI section or the second GUI section;
- operating the touch-sensitive graphical display to present content in the content section based upon the GUI section of the first and section GUI sections to which the touch event data points are associated; and
- interpreting the touch event data points within the GUI section of the first and second GUI sections to which the touch event data points are associated as a gesture input.

17. The method of claim 16, further comprising:
- providing a command instruction to the first dispensing system if the touch event data points are associated to the first GUI section; and
- providing the command instruction to the second dispensing system if the touch event data points are associated to the second GUI section.

18. The method of claim 16, wherein the touch event data points are associated to the first GUI section and further comprising:
- selecting content for the content section based upon the association of the touch event data points to the first GUI section;
- operating the touch-sensitive graphical display to present the selected content in the content section; and
- providing a first command instruction to the first dispensing system based upon the touch event data points associated to the first GUI section.

19. The method of claim 18, comprising:
- further receiving touch event data points of the plurality of touch event data points that are associated to the second GUI section subsequently and concurrently to the touch event data points of the plurality of touch event data points that are associated to the first GUI section; and
- determining if the first command instruction has been provided to the first dispensing system;
- wherein upon providing the first command instruction to the first dispensing system:
  - selecting content for the content section based upon the association of the touch event data points to the second GUI section;
  - operating the touch-sensitive graphical display to present the selected content in the content section; and
  - providing a second command instruction to the second dispensing system based upon the touch event data points associated to the second GUI section.

20. The method of claim 16, wherein the first GUI section, the second GUI section, and the content section are non-overlapping GUI sections forming a GUI layer of a hierarchy of GUI layers.

* * * * *